United States Patent Office 3,357,958
Patented Dec. 12, 1967

3,357,958
VULCANIZATION WITH HEPTASULFUR IMIDE
Kamal Naguib Ayad, Ruabon, Wrexham, Wales, assignor to Monsanto Chemicals Limited, London, England, a British company
No Drawing. Filed June 7, 1965, Ser. No. 462,064
7 Claims. (Cl. 260—79.5)

The invention relates to a process for the vulcanization of rubber, and more particularly to a process employing a vulcanizing agent containing chemically-bound sulfur.

Sulfur is the most widely used vulcanizing agent for the vulcanization of rubber. Vulcanizates having modified physical properties, for example in certain instances improved durability, can however be produced by using a vulcanizing agent other than sulfur.

We have now found that heptasulfur imide and its derivatives are particularly efficient vulcanizing agents for rubber.

The present invention accordingly comprises a processss for the vulcanzation of rubber in which a compound containing a heptasulfur imide grouping $$\begin{array}{c} S-S-S \\ S \diagdown \diagup N- \\ S-S-S \end{array}$$

is employed as a vulcanizing agent.

The compounds can be used as vulcanizing agents for rubber in place of or as a partial replacement for sulfur. Some of the compounds are preferably used in conjunction with a conventional vulcanization accelerator. Certain compounds containing a heptasulfur imide grouping also have incorporated in the molecule another structure, for example a thiazyl or dithiocarbamyl group, that confers accelerator properties on the compound itself.

The compound can contain one or more heptasulfur imide groupings. Those that contain one such group can be represented by the formula $$\begin{array}{c} S-S-S \\ S \diagdown \diagup N-R \\ S-S-S \end{array}$$

and include heptasulfur imide itself, where R in the above formula is H; aliphatic and aromatic substituted imides where R in the above formula is an aliphatic or aromatic group; acyl and thioacyl derivatives of heptasulfur imide where R in the above formula is a group

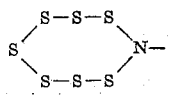

in which X is oxygen or sulfur and R' is an aliphatic or aromatic group; aminoalkyl derivatives of heptasulfur imide, in particular compounds of the above formula in which R is a grouping

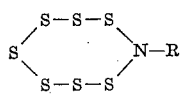

where R' and R" are each an aliphatic or aromatic group or where R' and R" are linked to form a saturated ring with the nitrogen atom, for example a piperidino or morpholino ring; aliphatic and aromatic thioalkyl derivates, in particular compounds where R in the above formula is a group R'—S—CH₂— in which R' is an aliphatic or aromatic group; thiocarbamyl heptasulfur imido sulfides, in particular compounds of the above formula where R is a group:

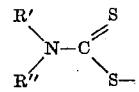

and R' and R" have the same significance as in the aminoalkyl derivatives referred to above; heptasulfur imido thiazyl sulfides, in particular heptasulfur imido benzothiazyl monosulfides of the above formula where R is a group:

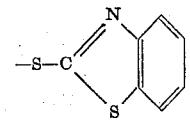

in which the benzene ring can optionally be substituted; and heptasulfur imidoalkylthiobenzothiazoles, in particular heptasulfur imidomethylthiobenzothiazoles of the above formula where R is a group:

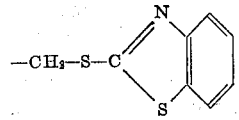

in which the benzene ring can optionally be substituted, and which can exist in tantomeric equilibrium with the corresponding N(heptasulfur imidoalkyl) thiazolinethiones.

Where in any of the above formulae R, R' or R" is an aliphatic group, this can be for example an alkyl group having either a straight or branched chain, such as for instance a methyl, ethyl, isopropyl, butyl, or octyl group, a substituted alkyl group, for instance a chloromethyl, hydroxymethyl, or cyanoethyl group, a cycloalkyl group, for instance a cyclohexyl group, or an aralkyl group, for instance a benzyl group. Where R' or R" in any of the above formulae is an aromatic group, this can be for example an aryl or substituted aryl group, for instance a phenyl or chlorophenyl group.

Examples of compounds containing more than one heptasulfur imide grouping are bis(heptasulfur imido) sulfides, bis(heptasulfur imido thiocarbonyl) sulfides, and compounds in which two heptasulfur imido thiocarbonylthio groups are linked through a methylene or substituted methylene group, for example a carboxy substituted methylene group.

Specific examples of vulcanizing agents containing a heptasulfur imide grouping are N-methyl heptasulfur imide, N-phenyl heptasulfur imide, N-acetyl heptasulfur imide, N-benzoyl heptasulfur imide, N-chloroacetyl heptasulfur imide, N-caproyl heptasulfur imide, N-p-nitrobenzoyl heptasulfur imide, N-thiopropionyl heptasulfur imide, N-diethylaminomethyl heptasulfur imide, N-benzylthiomethyl heptasulfur imide, N(morpholinothiocarbonylthio) heptasulfur imide, N(2-benzothiazylthio) heptasulfur imide, N(2-benzothiazylthiomethyl) heptasulfur imide, bis(heptasulfur imido thiocarbonyl) monosulfide, bis(heptasulfur imido thiocarbonyl) disulfide, and methyl bis(heptasulfur imido thiocarbonylthio) acetate.

Heptasulfur imide can be obtained for example by the methods described by Becke-Goehring, Jenne and Fluck in Ber. (1958) 91, 1947, and its acyl derivatives by the method described by Colchester, Tavo and Schulzesteinen in the Journal of the Chemical Society, 1963, 4918, or by method of Goehring and Koch [Z. Naturforsch. (1952), 76, 634].

The other derivatives of heptasulfur imide that can be used in the vulcanization process according to the present invention are new compounds. In general, they can be obtained by adaptation of known processes for the production of analogous compounds containing a secondary amino or cyclic amino grouping in place of the heptasulfur imide grouping or groupings of the present compounds.

The compounds containing a heptasulfur imide grouping can be used in the vulcanization of natural and synthetic rubbers. Synthetic rubbers that can be vulcanized are the sulfur-vulcanizable elastomers, including polymers of 1,3-butadienes, for instance of 1,3-butadiene itself and of isoprene, and copolymers of 1,3-butadienes with other monomers, such as styrene, acrylonitrile, isobutylene or methyl methacrylate.

Where the vulcanizing agent is used in conjunction with a vulcanization accelerator, the latter can be for example a thiazole type accelerator, for instance 2-mercaptobenzothiazole, 2-benzothiazyl disulfide, N-cyclohexylbenzothiazole-2-sulfenamide, or 2(morpholinothio) benzothiazole, or a dithiocarbamate type accelerator for instance tetramethyl thiuram monosulfide or tetraethyl thiuram disulfide.

In the vulcanization process, the vulcanizing agent is usually used together with other conventional rubber additives, for example zinc oxide, stearic acid, a filler or an antioxidant.

Mixing of the vulcanizing agent and any other additive with the rubber can be carried out by conventional means, using for example an internal mixer or a roll mill, or by adding a solution or suspension to a rubber latex, giving a mixture which is subsequently vulcanized at an elevated temperature. This temperature is one that is appropriate to the particular rubber concerned, for example a temperature of about 135°–155° C. where the composition is based on natural rubber, or a temperature of about 140°–160° C. where the composition is based on a styrene-butadiene rubber.

The amount of vulcanization agent used depends on a number of factors, including for example the type of rubber and the use for which the vulcanized product is required. The amount is, however, usually within the range 0.5 to 5 parts by weight, for example 1.0, 2.0, or 2.5 parts by weight, per 100 parts by weight of rubber.

Where an accelerator is used, the amount employed can vary according to circumstances, but is usually within the range 0.3 to 3 parts by weight, for example 0.5 or 1.0 part by weight, per 100 parts by weight or rubber.

Conventional amounts of the other additives referred to above can be used.

The invention is illustrated by the following examples.

*Example 1*

This example describes the production of vulcanizates using heptasulfur imide as a vulcanizing agent under test conditions.

A masterbatch of the following composition was prepared by compounding on a mil:

| | Parts by weight |
|---|---|
| Pale crepe | 100 |
| Zinc oxide | 3 |
| Stearic acid | 1 |

An amount of heptasulfur imide equivalent to 2 parts by weight per 100 parts by weight of the rubber was then incorporated into a portion of the masterbatch. Heptasulfur imide equivalent to 2 parts by weight per 100 parts by weight of rubber and 2-benzothiazyl disulfide equivalent to 1 part by weight per 100 parts by weight of rubber were incorporated into a second portion of the masterbatch, and for comparison third and fourth stocks were prepared by incorporating 0.8 part by weight of sulfur and 4.2 parts by weight of 2-benzothiazyl disulfide per 100 parts by weight of rubber into a third portion of the masterbatch and 3 parts by weight per 100 parts by weight of rubber of 4,4'-morpholine disulfide, a commercially available vulcanizing agent, into a fourth portion of the masterbatch. Each mix was allowed to stand for 24 hours before being tested.

In one test method used to assess the effectiveness of heptasulfur imide as a vulcanizing agent, the degree of vulcanization of a mix after various cure times at 160° C. was determined by measuring the extent to which a cured sample swelled on immersion in benzene for 24 hours at room temperature, the extent of swelling being inversely proportional to the degree of vulcanization. The procedure was that of British Standard Specification 903, Part A16, Method C, using strips cured in 1 mm. x ½ inch x 4 inch moulds.

In a second test method, scorch time at 140° C. and the cure rate as indicated by the time taken for the stock to reach optimum cure at 140° C. were measured using in Agfa Vulkameter.

The results given in the following table show that heptasulfur imide is a very effective vulcanizing agent which produces a more highly cured vulcanizate than sulfur when used in conjunction with 2-benzothiazyl disulfide.

| Curing System | Phr. | Percent Linear Swelling in Benzene Cure time (min.) | | | Vulkameter at 140° C. | |
|---|---|---|---|---|---|---|
| | | 7.5 | 15 | 30 | Scorch time (min.) | Time to optimum cure (min.) |
| Heptasulfur imide | 2 | 75 | 73 | 78 | 3 | 47 |
| Do | 2 | 62 | 62 | 62 | 7 | 30 |
| 2-benzothiazyl disulfide | 1 | | | | | |
| Sulfur | 0.8 | 69 | 67 | 69 | 20 | 57 |
| 2-benzothiazyl disulfide | 4.2 | | | | | |
| 4,4-morpholine disulfide | 3 | >150 | 111 | 87 | >60 | |

*Example 2*

This example describes the use of heptasulfur imide as a vulcanizing agent in a tire-tread stock.

The masterbatch had the following composition:

| | Parts by weight |
|---|---|
| Smoke sheets | 100 |
| Zinc oxide | 5 |
| Stearic acid | 3 |
| Process oil | 3 |
| High abrasion furnace black | 50 |

Two series of vulcanizates were produced by adding to separate portions of the masterbatch sulfur in conjunction with N-cyclohexyl-benzothiazole-2-sulfenamide and heptasulfur imide in conjunction with N-cyclohexylbenzothiazole-2-sulfenamide respectively, the vulcanizing agent (i.e., either sulfur or heptasulfur imide) being used at levels between 1.5 and 3 parts by weight per 100 parts by weight of rubber, and the N-cyclohexylbenzothiazole sulfenamide at 0.5 part by weight per 100 parts of rubber. Vulcanization was effected by heating at 140° C. to a state of optimum cure, and the moduli of the vulcanizates thus produced were measured.

The results showed that the production of a vulcanizate having a given modulus required the use of approximately 66% more sulfur than heptasulfur imide, thus demonstrating the effectiveness of heptasulfur imide as a vulcanizing agent.

*Example 3*

This example describes the use of heptasulfur imide as a vulcanizing agent in a gum stock.

The masterbatch had the following composition:

| | Parts by weight |
|---|---|
| Smoke sheets | 100 |
| Zinc oxide | 5 |
| Stearic acid | 2 |
| 2,2'-dithiobis(benzothiazole) | 1 |

To separate portions of the masterbatch were added 2.5 parts by weight of sulfur and 2.4 parts by weight of heptasulfur imide, respectively. The stock containing sulfur reached optimum cure in 45 minutes at 144° C. and had a modulus of elasticity of 800 p.s.i. at 500% elongation. The stock containing heptasulfur imide reached optimum cure in 40 minutes at 144° C. and had a modulus of elasticity of 1650 p.s.i. at 500% elongation.

It is intended to cover all changes and modifications of the examples of the invention herein chosen for purposes of disclosure which do not constitute departures from the spirit and scope of the invention.

What is claimed is:

1. A process for the vulcanization of a sulfur-vulcanizable rubber which comprises heating said rubber in the presence of a compound containing a hepta-sulfur imide grouping of the formula

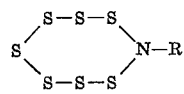

as a vulcanizing agent wherein R is a radical that will not destroy the effectiveness of the heptasulfur imide moiety as a vulcanizing agent.

2. A process according to claim 1, in which the compound containing the heptasulfur imide grouping is incorporated into unvulcanized sulfur-vulcanizable rubber and the mixture is heated to effect vulcanization.

3. A process according to claim 1, in which the compound containing the heptasulfur imide grouping is heptasulfur imide itself.

4. A process according to claim 3, in which 0.5 to 5 parts by weight of heptasulfur imide are used per 100 parts by weight of the rubber.

5. A process according to claim 3, in which the heptasulfur imide is used in conjunction with a vulcanization accelerator.

6. A process according to claim 5 in which the vulcanization accelerator is a member of the thiazole class of accelerators.

7. Sulfur-vulcanizable rubber having incorporated therein a vulcanizing amount of heptasulfur imide.

No references cited.

JOSEPH L. SCHOFER, *Primary Examiner.*

D. K. DENENBERG, *Assistant Examiner.*